United States Patent
Cunningham

[19]

[11] Patent Number: 5,842,816
[45] Date of Patent: Dec. 1, 1998

[54] PIG DELIVERY AND TRANSPORT SYSTEM FOR SUBSEA WELLS

[75] Inventor: Christopher E. Cunningham, Spring, Tex.

[73] Assignee: FMC Corporation, Chicago, Ill.

[21] Appl. No.: 73,023

[22] Filed: May 4, 1998

Related U.S. Application Data

[60] Provisional application No. 60/048,317, May 30, 1997.

[51] Int. Cl.$^6$ .................. F16L 1/04; E21B 33/16
[52] U.S. Cl. .............. 405/170; 15/104.062; 137/242; 166/70; 405/158
[58] Field of Search .................. 405/169–171, 405/154, 158; 15/104.062; 137/268, 242; 166/70

[56] References Cited

U.S. PATENT DOCUMENTS

| | | | |
|---|---|---|---|
| 3,169,263 | 2/1965 | Eagleton | 15/104.062 |
| 3,186,014 | 6/1965 | Allen | 15/104.062 |
| 3,218,659 | 11/1965 | Rowley | 15/104.062 |
| 3,232,090 | 2/1966 | Walker | 137/268 X |
| 3,404,421 | 10/1968 | Surber | 15/104.062 |
| 3,543,324 | 12/1970 | Knapp et al. | 15/104.062 |
| 3,562,014 | 2/1971 | Childers et al. . | |
| 3,608,631 | 9/1971 | Sizer | 166/70 |
| 3,779,270 | 12/1973 | Davis | 137/268 |
| 4,135,949 | 1/1979 | Reese | 134/18 |
| 4,268,932 | 5/1981 | Hogan | 15/104.062 |
| 4,336,482 | 6/1982 | Lankston | 15/104.062 |
| 4,457,037 | 7/1984 | Rylander | 15/104.062 |
| 4,574,830 | 3/1986 | Rickey et al. . | |
| 4,709,719 | 12/1987 | Littleton et al. | 137/268 |
| 4,736,482 | 4/1988 | Lankston . | |
| 4,793,016 | 12/1988 | Valentine et al. | 15/104.062 |
| 5,040,603 | 8/1991 | Baldridge | 166/70 X |
| 5,095,988 | 3/1992 | Bode | 166/70 X |
| 5,277,248 | 1/1994 | Breland | 166/70 |
| 5,435,338 | 7/1995 | Da Silva et al. . | |
| 5,437,302 | 8/1995 | Da Silva et al. . | |

*Primary Examiner*—Dennis L. Taylor
*Attorney, Agent, or Firm*—Bush, Riddle & Jackson, L.L.P.

[57] ABSTRACT

A pig delivery and transport system shown schematically in FIG. 1 has a looped line generally indicated at (10) divided into three sections (10A), (10B) and (10C). Line section (10A) is a low pressure non-product line section extending from a product receiving facility (PF) or host to an upstream shut-off valve (20). Line section (10B) is a high pressure product line section extending from downstream shut-off valve (22) to host facility (PF) and receives product from wells (W1) and (W2). Intermediate line section (10C) is a connecting line section between shut-off valves (20) and (22) to connect the non-product line section (10A) to the product line section (10B). A pig inserted at host (PF) is transported along low pressure non-product line section (10A) into connecting line section (10C) while upstream shut-off valve (20) is open and vent valve (28) is open in vent line 26. For transfer of the pig to the product line section (10B), shut-off valve (20) and vent valve 28 are closed and shut-off valve (22) is opened with a boost fluid obtained from a pressurized fluid source (32) through boost line (30) pushing the pig past branch lines (12) and (14) from wells (W1) and (W2). In this position, the pressurized product in product line section (10B) from wells (W1) and (W2) returns the pig to the product receiving facility (PF).

11 Claims, 1 Drawing Sheet

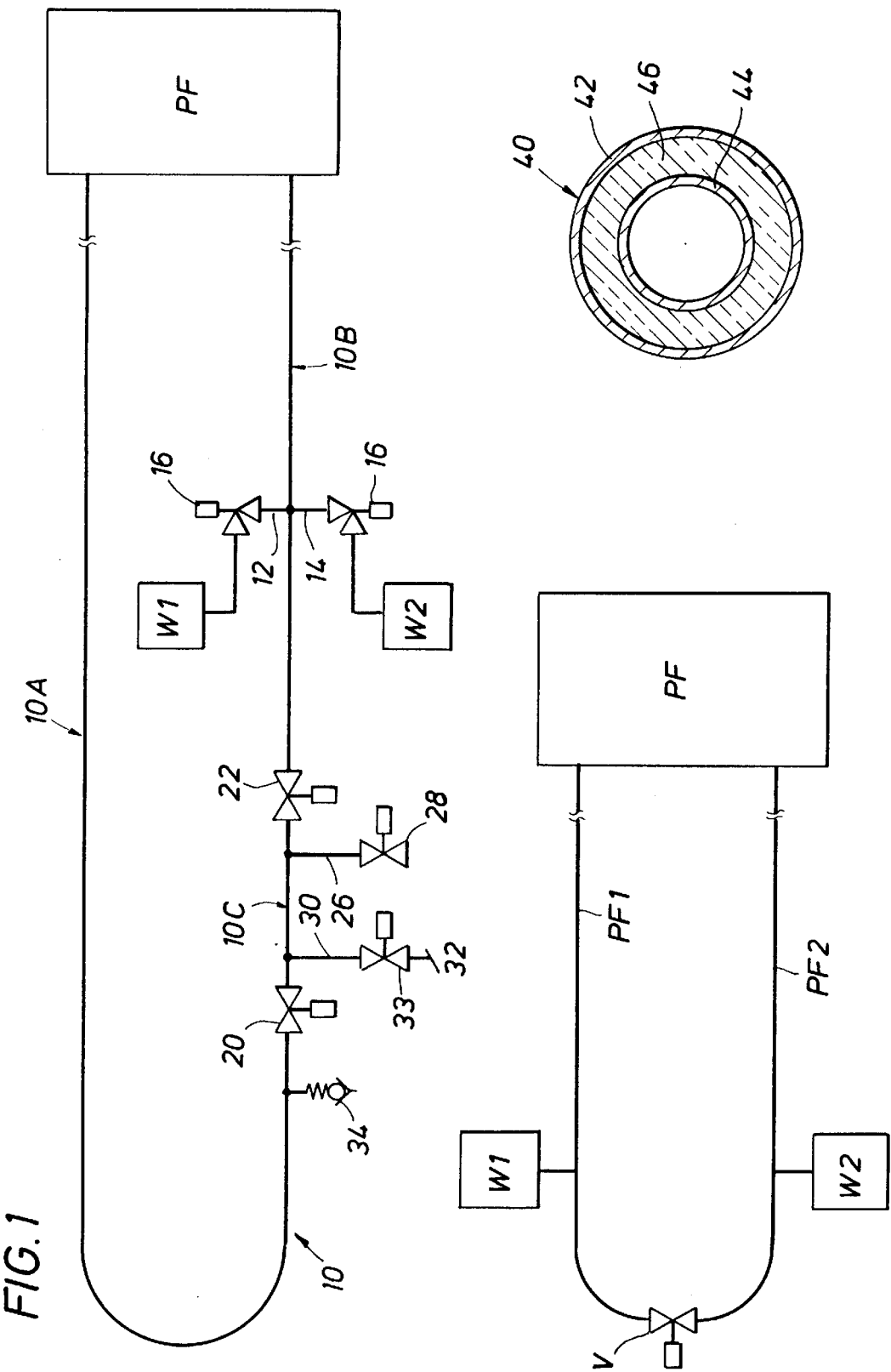

PIG DELIVERY AND TRANSPORT SYSTEM FOR SUBSEA WELLS

BACKGROUND OF THE INVENTION

Cross Reference to Related Application

This application claims the priority of provisional application Ser. No. 60/048,317 filed May 30, 1997.

Field of the Invention

This invention relates to the field of pigging flowlines between subsea wells and a product receiving facility.

Description of the Prior Art

There are many applications associated with the development of subsea oil and/or gas fields where there exists the requirement to "pig" the flowlines between subsea wells and the product receiving "host" facility. A "pig" as used in this specification describes any of a variety of typically full bore objects pumped through a pipeline or flowline for any of a variety of purposes. For example, a pig may be used to sweep water out of a flowline (following its installation) by pumping it ahead of a volume of gas or other desirable medium. Other types of pigs, known at times as "intelligent pigs", may include a long train of modules which incorporate sensors for measuring pipe wall thickness, or pipe joint weld integrity, for example. One of the more common type of pigs is often referred to as a "scraper pig" which is pumped through a pipeline to remove scale and/or paraffin deposits which can build up over time resulting in a variety of problems including localized jetting, reduced production rate, and even full clogging of the line.

Under normal circumstances, product from one or more remote subsea gas wells (or non-waxing/non-scaling oil wells) is delivered to a processing facility (typically a bottom supported platform or a floating production facility, commonly referred to as a "host" facility) through a single flowline. Conventional practice is to provide a second flowline of the same nominal bore size as the first if there is a requirement for frequent pigging of the flowline. The second flowline allows a pig to be loaded into one flowline at the host facility such that the pig may be pumped therefrom (using hardware supplied and maintained thereon) to the subsea wells. A loop adjacent the subsea well or wells connecting two or more associated flowlines allows the pig to be transferred from one flowline to another flowline so that the pig may be returned to the host facility, typically driven by the well product.

For a variety of reasons, subsea wells are typically located several miles away from their respective host facilities (current record offset is approaching 70 miles). As a result, the cost of purchasing, installing, protecting, commissioning, inspecting and maintaining flowlines is usually one of the largest expenditures associated with subsea oil/gas field development. In fact, many single satellite (and even multi-well) projects have failed to come to fruition because of the costs associated with flowlines.

As a result of the foregoing, subsea hydrocarbon field developers/operators are constantly trading off techniques for reducing the impact of flowline costs on "life of field" economics. Wherever practical, step-off wells are drilled from host facilities. To reduce the required flowline pigging frequency, a flowline may be insulated or even heated, or large volumes of chemicals may be injected into the flowlines. If the required pigging frequency can be sufficiently reduced, a single flowline may be used which has facilities at the subsea well end to accept a subsea pig launcher. A subsea pig launcher is a device which typically stores pigs at the subsea-end of a flowline so that they may, upon (typically remote) command, be loaded into the flowline without the requirement for a second flowline.

Nevertheless, some fields may still require a combination of some of the above techniques in addition to multiple, round trip piggable (relative to the host facility) flowlines. There are other costs associated with pigging, such as delayed or lost production, which is the loss of revenue that could be earned if production does not have to be interrupted to accommodate the pigging operation (as one example). Because the path to be pigged includes typically two flowlines which are "looped together" at the subsea wells, production typically is stopped or at least substantially reduced while the pig is being pumped from the host facility to the subsea termination of the pig returning flowline. This is done so that the fluid in the first flowline ahead of the pig can be displaced into the second flowline and subsequently back to the host. Of course, production may to a great extent be resumed to drive the pig down the second flowline back to the host facility. There are techniques available which can be used to minimize or avoid delayed or "lost production" associated with pigging. In one scenario, a "third line" can be added to take the returns ahead of the pig as it is pumped down one of the main production lines. During this stage of the pigging process, some or all of the wells remain on production through the other production flowline. This technique is sometimes referred to as "pigging on the run".

There are a variety of proven methods for reducing the impact of flowline costs on overall economics. Where reservoir "geometry" and drilling technology permit, multiple wells can be drilled from closely positioned seabed locations such that fewer flowlines can service more wells (e.g., manifolding the product from those wells into shared flowlines). Obvious tradeoffs for this solution include the requirement to balance production pressures between the wells (i.e., choking/pumping) and the increased impact regarding delayed or lost production associated with pigging activities. Furthermore, flowline size must be larger for the manifolded case, which may reduce installation vessel options, thereby driving costs and schedule. For highly pocketed, and/or broad and shallow reservoirs, a manifolded solution may not be practical. In the worst case, each subsea well may require that dual flowlines be run between the well and the host facility to accommodate round trip pigging.

An alternative technique often employed to the foregoing is to run a single flowline between each well and the host facility, and also a flowline between two wells which are relatively close to one another. This technique provides a shared piggable path for two wells while also allowing each well to produce independently through its own flowline, assuming a valve is provided which may be closed in the path between the two wells to isolate production. There may be a significant impact regarding delayed or lost production for this "paired wells" technique.

Another flowline technique often considered for dealing with highly pocketed, and/or broad and shallow reservoirs (which require that multiple subsea wells be widely spaced across a seabed) is to have a single large diameter flowline loop originating and terminating at the host facility, and weaving a path running close to each subsea well. This technique may be described as a massive "ring main" type manifold where the flowline represents the header and the wells are tapped into it by some form of jumper. Depending on the well count, the flowline size may be required to be substantial resulting in an installation and tie-in difficulty, and a reduction in practical pressure rating capability, for example. Of course, the potential for delayed or lost production impact is significant.

U.S. Pat. No. 3,562,014 dated Feb. 9, 1971, shows a scraper pig system in which a pig magazine is positioned between a pair of product flowlines with pigs being selectively inserted within the product flowlines from the pig magazine.

IDENTIFICATION OF OBJECTS OF THE INVENTION

It is an object of the invention to provide reduced overall flowline costs by providing an alternative to the techniques requiring a subsea pig launcher or a production capable second (or third) flowline to accommodate round trip pigging.

Another object is to provide a looped line from a production facility to subsea wells for receiving a pig with one section of the looped line being a low pressure non-product section and another section being a high pressure product section from the subsea wells to the production facility.

SUMMARY OF THE INVENTION

As an alternative to a subsea pig launcher or a production rated second (or third) flowline provided primarily for the purpose of accommodating "round trip" pigging, a low pressure pig delivery/transport line (PDTL) is provided according to the invention. A looped line extends from the product receiving facility (also known as a "host" facility) to the subsea wells and returns to the host facility. The looped line includes a low fluid pressure non-product line section extending from the host facility to the subsea wells and a high fluid pressure product line section extending from the subsea wells to the host facility for the transport of product from the subsea wells to the host facility.

A pair of longitudinally spaced shutoff valves are provided in the looped line upstream of the subsea wells, and an intermediate connecting line section extends between the valves to connect the low fluid pressure non-product line section to the high pressure product line section. A pig is introduced into the low pressure line at the host facility so that it can be pumped toward the subsea well or wells. Valves associated with the intermediate pipe section allow fluid ahead of the pig (perhaps sea water) to be vented into the ocean near the well or wells. With this capability the pig can be delivered to the subsea well end of the flowline without having to interrupt production through the high pressure line. For transfer of the pig from the low pressure line section to the high pressure line section, the pig is first received within the intermediate connecting line section from the low pressure line section with the downstream shutoff valve closed and the upstream shutoff valve and fluid vent valve open. Then the upstream shutoff valve and fluid vent valve are closed and the downstream shutoff valve is opened to expose the intermediate line section to high pressure fluid from the high pressure product line section. A boost branch line connected to the intermediate connecting line section is opened to provide high pressure fluid to the connecting line section behind the pig to push the pig past the branch lines for the subsea wells to permit return of the pig to the host facility through the high pressure product line section driven by well fluids.

Thus, a pig delivery/transport system for pigging a looped flowline between subsea wells and a host facility is provided in which a low fluid pressure non-product line section extends from the host facility, and a high pressure product line section extends from the subsea wells to the host facility for transport of the pig and product to the host facility. The pig delivery/transport system of this invention reduces overall flowline costs (low pressure PDTL vs. conventional redundant high pressure line) and minimizes the impact on operations (i.e., permits use of any type of pig, and accommodates pigging without interrupting normal production).

BRIEF DESCRIPTION OF THE DRAWINGS

The objects, advantages and features of the invention will become more apparent by reference to the drawings which are appended hereto and wherein an illustrative embodiment of the invention is shown, of which:

FIG. 1A is a schematic view of a prior art paired wells system in which each subsea well has a dedicated flowline to a host facility, and where the flowlines are joined at the subsea end by a "loop" through which pigs can be passed from one flowline to the other;

FIG. 1 is a schematic view of a paired wells arrangement in accord with the present invention in which a looped flowline to a host facility has a low pressure non-product line section for receiving a pig and a high pressure product line section from the paired wells for transport of product and a pig to the host facility; and FIG. 2 is a cross sectional view of a product flowline in which insulation is provided between a pair of concentric pipes.

DESCRIPTION OF PRIOR ART

FIG. 1A is a schematic of a prior art pigging system in which a host facility PF has a looped line extending therefrom comprising separate product flowlines PF1 and PF2. Wells W1 and W2 are connected to respective flowlines PF1 and PF2 so that each well, W1, W2 has a dedicated flowline PF1, PF2 for the transport of product to the host facility PF. For normal production, a pigging valve V between flowlines PF1 and PF2 is closed, and each well W1, W2 produces into its own dedicated flowline PF1, PF2. As a result, there is no requirement for subsea choking or pumping to balance pressure, as is required for a manifolded system. To pig either flowline PF1 or PF2, both wells W1, W2 must typically be shut in, and pigging valve V opened to accommodate passage of a pig.

DESCRIPTION OF THE INVENTION

Referring to FIG. 1, a schematic of the pig delivery and transport system comprising the present invention is illustrated in which host facility PF has a looped line generally indicated at 10 extending therefrom. Wells W1 and W2 have branch lines 12 and 14 which extend to line 10. A choke 16 is provided in each (or at least one) branch line 12, 14 to balance the pressure of product flow from wells W1 and W2 to line 10 for transport to host facility PF. Remote actuators are provided for choke(s) 16 as well as for the other valves described below for remote control of this pig system. Of course, more than two wells and respective branch lines may be provided or even one well and branch line are contemplated according to the invention.

Looped line generally indicated at 10 is divided into three main line sections or portions along the length of line 10. A first non-product carrying line section 10A extends from host facility PF to a shut-off valve 20 which is positioned upstream of wells W1 and W2. A second product line section 10B extends from another shut-off valve 22 located downstream of shut-off valve 20 and upstream of wells W1 and W2 past branch lines 12, 14 for wells W1 and W2 to host facility PF. A third intermediate or connecting line section 10C is provided between shut-off valves 20, 22 and connects line section 10A to line section 10B. A vent line 26 for intermediate line section 10C has a vent valve 28 and is utilized to vent non-product carrying line 10A and intermediate line section 10C in front of an advancing pig when shut-off valve 20 is open and shut-off valve 22 is closed. A branch fluid "kick" line 30 for line section 10C is connected to a pressurized fluid supply source (typically the host facility),and a supply valve 33 permits the supply of pressurized fluid to connecting line section 10C when shut-off valve 22 is open and shut-off valve 20 is closed for displacing a pig from the intermediate line section 10C to beyond branch lines 12 and 14 from wells W1 and W2 in product line section 10B. A pressure balance valve 34 is provided for line section 10A adjacent to and upstream of shut-off valve 20.

Production from wells W1 and W2 is co-mingled into product line section 10B through choke(s) 16. Thus, line section 10B forms a high pressure product line conduit for the transport of product from wells W1, W2 to host facility PF. Line section 10A provides a low pressure non-product conduit for a pig to be transported from host facility PF to high pressure product line section 10B via intermediate line section 10C for running through high pressure product line section 10B for cleaning or inspection, for example. Intermediate line section 10C is exposed to the same high fluid pressure as high pressure product conduit 10B and requires a similar pressure rating. Pig conduit 10A may be a light weight, typically low pressure rated steel pipe, flexible pipe (even "hose") or hybrid line that serves as a conduit for pigs inserted at the host facility PF which is disposed near the subsea wells W1, W2.

Pig conduit or line section 10A need only be rated to withstand internal pressure required to pump the pig down conduit 10A. It may be desirable to rate this line to a pressure which might be required to allow circulation of a pig throughout the full flowline loop 10 under pressure supplied from the host facility. Line section 10A is normally only pressurized by the pig delivery pumping medium (typically water or a suitable gas) or balanced to ambient sea water pressure by balance valve 34 or multiple balance valves incorporated in pig conduit 10A for this purpose. A high pressure rated section of line in pig conduit 10A may be provided proximate host facility PF for deep water subsea well applications, because the air-exposed and near-water-surface-exposed length of line will not have the benefit of substantial sea water "head" to compensate for possible pig transport pump pressures.

Since pig conduit 10A is not exposed to produced fluids, and assuming only "ocean environment compatible" fluids are used to drive pigs down the pig conduit 10A, vent valve 28 may be utilized to accommodate evacuation of the fluids in front of a pig while the pig is progressing down pig conduit 10A from host facility PF. Vent valve 28 and shut-off valve 20 are open throughout the operation of transporting the pig to intermediate conduit 10C. Shut-off valve 22 and fluid pressure supply valve 33 are closed while the pig is being transported. Because shut-off valve 22 isolates the pig delivery process from product conduit 10B (and thereby isolates wells W1 and W2), the arrangement substantially eliminates delayed or lost production associated with pigging.

Once the pig has reached downstream shut-off valve 22 which is closed, upstream shut-off valve 20 is closed. At this point, the pig delivery line 10A may be vented to ambient pressure. To transfer the pig into product conduit 10B, shut-off valve 22 is first opened to provide a path for the pig while shut-off valve 20 remains closed. Next, valve 33 in kick line 30 is opened, and the pig is pushed by the fluid pressure from kick line 30 into product conduit 10B past branch lines 12, 14 to a short distance beyond wells W1, W2. Once the pig moves past branch lines 12, 14, the injection of boost fluid from kick line 30 may be stopped, because the pig will be driven through line section 10B to the host facility PF under reservoir power from wells W1 and W2. While boost line 30 is supplying pig transfer fluid, the produced fluids from wells W1 and W2 cannot back flow into intermediate connecting line 10C. Thus, produced fluids will not be released to the environment by vent valve 28 during subsequent pigging cycles.

While it is likely that product conduit 10B will need to be somewhat larger than either of the production flowlines PF1 or PF2 of the arrangement of FIG. 1A, the difference should be small because pipe cross-sectional area is a "squared function" of the diameter. For example, a single 5.66 inch internal diameter (ID) pipe has the same cross-sectional area as two 4 inch ID pipes. Furthermore, a 5.66" ID pipe can deliver more fluid volume per unit length than can two 4.00" ID pipes because of reduced friction/hydraulic energy loss.

A 5.66" ID pipe (for a given internal pressure rating) of 10B may have a lower heat loss/unit length than two 4.00" ID pipes because of its reduced "surface area" exposed to the low temperature ocean (although fluid velocity is another important consideration). The two 4.00" ID pipes expose about 40% more area than does the 5.66" ID pipe. If the 5.66" ID pipe is reduced to provide an equivalent volume transfer capability as compared to two 4.00" ID pipes (coincidentally providing similar flow velocity), the surface area ratio favors a single larger pipe even more (plus reduces cost/weight still further). A single larger pipe arrangement is especially attractive from a flowline cost perspective when insulation must be provided; however, larger/heavier arrangements can limit installation options.

Because pig delivery line 10A is not exposed to produced fluids, there should never be requirement for it to be insulated. This advantage, plus the previous advantage mentioned above, provides substantial money saving potential especially if "Pipe-In-Pipe (PIP)" insulation technology is specified/justified for the product line 10B. A typical PIP arrangement, 40 in FIG. 2, typically requires an external pipe 42 to have an outside diameter of 12.75" when the internal pipe 44 has an outside diameter of 8.63" (based on standard pipe sizes). Insulating material 46 is placed between external pipe 42 and internal pipe 44.

Installation of the pig delivery line 10A may be provided using a "reel" technique from a wide range of vessels. Low cost, speed of installation and flexible scheduling result from this method of installation.

The ID of conduit 10A may be sized marginally larger than that of product line 10B to minimize potential for pig induced damage. In fact "scraper" or other pigs may be driven by a "foam composition" or other "soft" pig (the "scraper" being sized for the smaller inside diameter of product line 10B, the "foam" being sized for line 10A). The OD of the soft pig is simply "chewed up" upon entering line 10B.

A single, typically welded steel/alloy or mechanically coupled steel/alloy or "flexible pipe" or "hose" or even "plastic" production flowline 10B of FIG. 1 combined with an associated non-product line 10A should be substantially less expensive to procure/install than two comparable production capable flowlines PF1, PF2 of FIG. 1A, even without insulation. Whereas subsea pig launchers are limited as to the types of pigs that can be interfaced, the arrangement of FIG. 1 which embodies the invention can accommodate all types of pigs. Furthermore, the arrangement of FIG. 1 can accept any combination of pigs deployed in any sequence over any period of time (unlike subsea pig launchers which must be "loaded" in advance, typically with a reserve or like-type pigs in order to minimize reloading frequency/cost). The invention provides the same flexibility afforded by two production rated lines for pigging operations.

Whereas FIG. 1 illustrates a "paired wells" arrangement with a pig delivery line 10A and a production line 10B, the invention may also be applied to traditional "manifold" applications where product from multiple wells is co-mingled for transport via relatively few (sometimes one) flowlines, or in fact any application where its features provide value and/or cost reduction. The schematic of FIG. 1 is provided to illustrate the example of a "paired wells" arrangement, but should not be viewed as limiting in any way for more universal applications of the invention disclosed herein of using a Pig Delivery/Transport Line to enhance subsea flowline applications. Similarly, the valving arrangement and types associated with the preferred embodiment for the invention illustrated in FIG. 1 may be modified to suit specific applications without deviating from the principles and scope of the invention.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A looped line for a traveling pig and having opposed ends connected to a product receiving facility for subsea wells for receiving the pig for movement along said line in one direction between said opposed ends, said looped line comprising, a high pressure product line section extending from the subsea wells to the production facility for product transport, a low pressure non-product line section extending from the product receiving facility, an intermediate connecting line section between said product line section and said non-product line section; and a pair of shut-off valves mounted adjacent opposite ends of said connecting line section and movable between open and closed positions to define upstream and downstream shut-off valves, whereby the pig is capable of movement through said low pressure non-product line section from the product receiving facility into said connecting line section with said downstream shut-off valve closed and said upstream shut-off valve open, the pig being capable of being transferred into said high pressure product line section from said connecting line section upon closing of said upstream shut-off valve opening of said downstream shut-off valve.

2. The looped line of claim 1 wherein, a fluid pressure boost line is in fluid communication with said connecting line section and is connected to a pressurized fluid source for selectively inserting a boost fluid in said connecting line section behind said pig upon closing of said upstream shut-off valve and opening of said downstream shut-off valve.

3. The looped line of claim 1 wherein, a vent line is in fluid communication with said connecting line section and has a valve therein for selective venting of said connecting line section and said low pressure non-product line section when said upstream shut-off valve is open and said downstream shut-off valve is closed.

4. The looped line of claim 1 wherein a pressure balance valve is in fluid communication with said low pressure non-product line section.

5. In a transport system for the transport of a hydrocarbon product from a plurality of subsea wells to a product receiving facility, said system comprising, a looped line having opposed ends connected to a product receiving facility and constructed and arranged to receive a traveling pig therein movable along said line between said opposed ends;

said looped line having a high pressure product line section extending from said subsea wells to the production facility for product transport, a low pressure non-product line section extending from the product receiving facility, and an intermediate connecting line section between said product line section and said non-product line section; and a pair of shut-off valves mounted adjacent said opposed ends of said connecting line section and movable between open and closed positions to define upstream and downstream shut-off valves, said valves permitting a pig to move therethrough from said low pressure non-product line section to said high pressure product line section.

6. The transport system of claim 5 wherein, a fluid pressure boost line is in fluid communication with said connecting line section and is connected to a pressurized fluid source for selectively inserting a pressurized boost fluid in said connecting line section behind said pig upon closing of said upstream shut-off valve and opening of said downstream shut-off valve thereby to force a pig into the high pressure product line section, and a branch line extends from each of said subsea wells to said high pressure product line section to provide product to said high pressure product line section for movement of the product and pig to the product receiving facility.

7. The transport system as set forth in claim 5 wherein, a vent line is in fluid communication with said connecting line section, said vent line having a valve therein for selective venting of said connecting line section and said low pressure non-product line section when said upstream shut-off valve is open and said downstream shut-off valve is closed.

8. The transport system of claim 5 wherein, a pressure balance valve is in fluid communication with said low pressure non-product line section.

9. The transport system of claim 5 wherein, said high pressure product line is insulated, and said low pressure product line is uninsulated.

10. The transport system of claim 9 wherein, said insulated high pressure product line includes inner and outer coaxial conduits, said inner conduit having a smaller diameter, said outer conduit having a larger diameter relative to said inner conduit, with insulation material disposed between said inner and outer conduit, and said uninsulated low pressure product line is of a diameter substantially the same as said inner conduit of said high pressure product line.

11. A method for transporting a pig from one end of a looped line to the other end thereof with the ends connected to a host facility for subsea wells, the looped line having a low pressure non-product line section adjacent said one end, a high pressure product line section adjacent said other end thereof extending between the subsea wells and the host facility, and a connecting line section between said low pressure non-product line section and said high pressure product line section, said method comprising the following steps, positioning a closure member adjacent each end of said connecting line section, each of said closure members being selectively movable between open and closed positions, with one closure member positioned adjacent said low pressure non-product line section to define an upstream closure member and the other closure member positioned adjacent said high pressure product line section to define a downstream closure member;

placing a vent line and a boost line in fluid communication with said connecting line adjacent said downstream and upstream closure members;

placing a selectively operable vent line closure member in said vent line and a selectively operable boost line closure member in said boost line;

inserting a pig in said low pressure non-product line section for movement along said non-product line section;

opening said upstream connecting line closure member, closing said downstream connecting line closure member, opening said vent line closure member, and closing said boost line closure member, and then moving said pig from said low pressure non-product line section into said connecting line section through said upstream closure member in the open position thereof; and closing said upstream connecting line closure member, opening said downstream connecting line closure member after said pig is received within said connecting line section, and then closing said vent line closure member, opening said boost line closure member for transferring said pig from said connecting line section into said high pressure product line section through said open downstream closure member for movement of said pig through said high pressure product line section to a position at which well fluids force said pig to said host facility.

* * * * *